2,965,638
N-SUBSTITUTED AZEPINES AND DIHYDRO-AZEPINES

Walter Schindler, Riehen, near Basel, Franz Hafl'ger, Basel, and Henri Dietrich, Birsfelden, Basel Land, Switzerland, assignors to Geigy Chemical Corporation, Ardsley, N.Y., a corporation of Delaware No Drawing. Filed Mar. 17, 1959, Ser. No. 799,842

Claims priority, application Switzerland Mar. 20, 1958

5 Claims. (Cl. 260—239)

The present invention relates to new N-heterocyclic compounds having valuable pharmacological properties, as well as to processes for the production thereof.

N-substituted azepines and dihydroazepines of the general formula

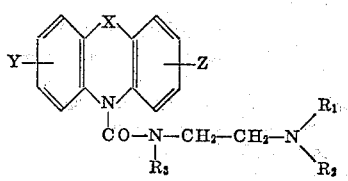

wherein

X represents the ethylene or vinylene group ($-CH_2-CH_2-$ or $-CH=CH-$).

Y and Z each represents hydrogen or a chlorine or bromine atom, and Y and Z may be identical or different, but if they are identical they are in the same relative position to the nitrogen atom, $R_1$ and $R_2$ represent low molecular alkyl radicals which can be bound to each other direct or by way of an oxygen atom, and $R_3$ represents hydrogen or a low molecular alkyl radical, as well as their salts and quaternary ammonium compounds, have not been known up to now.

It has now been found that these compounds have valuable pharmacological properties, in particular, local anaesthetic activity.

The tertiary bases defined above can be produced by reacting reactive functional derivatives of 10,11-dihydro-5-dibenzo[b.f] azepine-5-carboxylic acids or 5-dibenzo-[b.f]azepine-5-carboxylic acids, termed in the following as iminodibenzyl or iminostilbene-5-carboxylic acids respectively, which correspond to the general formula

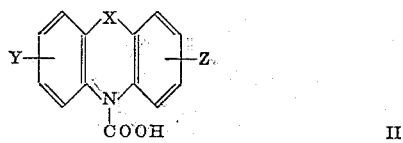

wherein X, Y and Z have the meanings given above, in particular reacting the chlorides, bromides or low molecular alkyl esters of these N-carboxylic acids which do not exist in the free form, with N,N-disubstituted or N,N,N'-trisubstituted ethylene diamines of the general formula

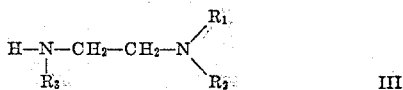

wherein $R_1$, $R_2$, $R_3$ and $n$ have the meanings given above. The reactions can be performed, for example, at temperatures of about 100–200° in the presence or absence of inert solvents such as toluene or xylene. An excess of the ethylene diamine derivative of Formula III used for the reaction can be used to bind the hydrogen chloride liberated by the reaction with acid halides and also as diluent.

The new compounds of the general Formula I can also be produced by reacting N-halogen alkyl amides of acids of the general Formula II which correspond to the general formula

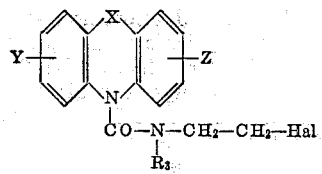

and wherein X, Y, Z and $R_3$ have the meanings given above, and Hal represents chlorine or bromine, with secondary amines of the general formula

wherein $R_1$ and $R_2$ have the meanings given above. In this case, an excess of the secondary amine used for the reaction is advantageously used as acid binding agent. The reaction is performed in the presence or absence of an inert organic solvent or diluent at a raised temperature, if necessary in a closed vessel. The reaction of the N,N-ethylene amide of an acid of the general Formula II, corresponding to the general formula

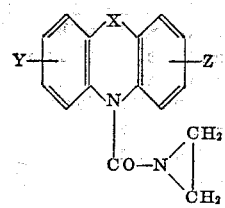

wherein X, Y and Z have the meanings given above, with a secondary amine of the general Formula V can serve as a particular method of performing this process for the production of compounds of the general Formula I in which $R_3$ is hydrogen.

Examples of reactive functional derivatives of acids of the general Formula II are iminodibenzyl-5-carbonyl chloride, 3-chloro- or 3-bromo-iminodibenzyl-5-carbonyl chloride, 3.7-dichloro- or 3.7-dibromo-iminodibenzyl-5-carbonyl chloride, iminostilbene-5-carbonyl chloride, 3-chloro- or 3-bromo-iminostilbene-5-carbonyl chloride and 3.7-dichloro- or 3.7-dibromo-iminostilbene-5-carbonyl chloride. These are obtained by reacting phosgene with the corresponding iminodibenzyls or iminostilbenes. The latter, in their turn, are obtained from the known iminodibenzyl (10,11-dihydro-5-dibenzo[b.f]-azepine) or the C-substitution products thereof by N-acylation, bromination in the 10-position with bromosuccinimide and then either subsequent or simultaneous splitting off of hydrogen bromide and hydrolysis, for example, by means of alkali lyes.

Ethylene diamines of the general Formula III suitable for reaction with the functional derivatives of acids of the general Formula II given above, are, for example, N,N-dimethyl-, N,N-diethyl-, N,N-di-n-propyl-, N,N-di-n-butyl-, N,N,N'-trimethyl-, N,N,N'-triethyl-, N,N-dimethyl-N'-ethyl-, N,N-dimethyl-N'-n-propyl-, N,N-dimethyl-N'-isopropyl-, N,N-dimethyl-N'-n-butyl-, N,N-diethyl-N'-methyl- and N,N-diethyl-N'-n-butyl- ethylene diamine, as well as N-($\beta$-pyrrolidino-ethyl)-, N-($\beta$-piperidino-ethyl)- and N-($\beta$-morpholino-ethyl)-amine, -methylamine, -ethylamine and -n-butylamine.

The N-halogen alkylamides necessary for the second production process are obtained, for example, by reacting iminodibenzyl- or iminostilbene-N-carboxylic acids with halogen alkylamines analogously to the first production process. Examples of starting materials of the general Formulas IV and VI are the N-(β-chlorethyl)-amides, N-(β-bromo-ethyl)-amides and N,N-ethylene amides of iminodibenzyl-5-carboxylic acid, 3.7-dichloro-iminodibenzyl-5-carboxylic acid and of iminostilbene-5-carboxylic acid.

The compounds produced according to the present invention having a tertiary basic amino group form salts, some of which are water soluble, with therapeutically compatible inorganic or organic acids such as hydrochloric acid, hydrobromic acid, sulphuric acid, phosphoric acid, methane sulphonic acid, ethane disulphonic acid, acetic acid, succinic acid, fumaric acid, maleic acid, malic acid, tartaric acid, citric acid, benzoic acid and phthalic acid.

By reacting the tertiary basic compounds with reactive esters, in particular halides and sulphates of aliphatic or araliphatic alcohols, with, for example, methyl iodide, dimethyl sulphate, ethyl bromide, ethyl iodide, diethyl sulphate, n-propyl bromide, n-butyl bromide, allyl bromide, allyl iodide, benzyl chloride, benzyl bromide, p-chlorobenzyl chloride or phenoxyethyl bromide, quaternary ammonium salts are obtained which also have valuable pharmacological properties, for example, spasmolytic activity.

The compounds according to the present invention, when used as local anaesthetics may be administered in the form of a 1–5% aqueous solution of their salts.

The most important compounds are those according to Formula I wherein Y and Z mean hydrogen or Z means chlorine in 3-position and $R_1$ and $R_2$ mean lower alkyl radicals, or $R_1$ and $R_2$ jointly with the N atom to which they are bound, mean the pyrrolidino radical.

The following examples further illustrate the production of the new compounds. Parts are given as parts by weight and their relationship to parts by volume is as that of grammes to cubic centimetres. The temperatures are in degrees centigrade.

Example 1

18.5 parts of iminostilbene-5-carboxylic acid chloride and 50 parts by volume of N,N-dimethyl-N'-butyl-ethylene diamine are heated for 2 hours in an oil bath at 160°. The reaction mixture is then cooled, poured into water and thoroughly ethered out. The basic portions are removed from the ethereal solution by shaking out four times with diluted acetic acid. The reaction of the combined acetic acid solutions is made alkaline with saturated potassium carbonate solution and the mixture is then ethered out. On adding alcoholic hydrochloric acid to the ethereal solution, the hydrochloric acid salt of iminostilbene - 5 - carboxylic acid-N-n-butyl-N-dimethylaminoethyl amide [5-(N-n-butyl-N-dimethylaminoethylcarbamyl)-iminostilbene] precipitates and it is recrystallised from abs. alcohol. M.P. 238–240°.

In an analogous manner, on using 18.6 parts of iminodibenzyl-5-carbonyl chloride and 50 parts by volume of N,N,N'-trimethylethylene diamine, the hydrochloride of iminodibenzyl - 5 - carboxylic acid-N-methyl-N-dimethylaminoethyl amide [5-(N-methyl-N-dimethylaminoethylcarbamyl)-iminodibenzyl] is obtained, M.P. 236–238°.

If 18.6 parts of iminodibenzyl-5-carbonyl chloride or 22 parts of 3.7-dichloro-iminodibenzyl-5-carbonyl chloride are reacted according to the above example with 50 or 60 parts respectively of N.N-diethyl-ethylene diamine, on concentrating the ether extracts of the acetic acid solutions which have been made alkaline, iminodibenzyl-5-carboxylic acid-N-diethylaminoethyl amide (M.P. 97° after recrystallisation from ether) or 3.7-dichloro-iminodibenzyl-5-carboxylic acid-N-diethylaminoethyl amide respectively precipitate in crystalline form. The iminodibenzyl-5-carboxylic acid-N-diethylaminoethyl amide may also be termed 5-(N-diethylaminoethyl-carbamyl)-iminodibenzyl.

Iminodibenzyl - 5 - carboxylic acid-N-n-butyl-N-(β-pyrrolidinoethyl)-amide or, using the alternative nomenclature, 5-[N-n-butyl - N - (β-pyrrolidinoethyl)-carbamyl]-iminodibenzyl (M.P. of hydrochloride: 220–222°) is obtained in an analogous manner.

Example 2

25.7 parts of iminodibenzyl-5-carboxylic acid chloride are dissolved in 100 parts by volume of abs. benzene and a solution of 14.0 parts of bromethylamine in 50 parts by volume of abs. benzene is added. An exothermic reaction takes place; the mixture is then refluxed for 1 hour. After cooling, the mixture is shaken out with water and the benzene solution is dried over sodium sulphate. The benzene solution is first stirred with 20 parts by volume of diethylamine at room temperature and then heated for 14 hours at 60°. After cooling, it is washed with water, and then the basic portions are extracted by shaking out with diluted hydrochloric acid. The acid aqueous extracts are made alkaline with concentrated caustic soda lye whereupon the base precipitates and is recrystallised from ether. The iminodibenzyl-5-carboxylic acid-N-diethylaminoethylamide so obtained melts at 97°.

The following compounds, for example, are obtained in an analogous manner by the processes described in the above examples from 3-chloro- or 3-bromo-iminodibenzyl-5-carboxylic acid chloride or 3-chloro- or 3-bromo-iminostilbene-5-carboxylic acid chloride:

3-chloro-iminodibenzyl-5-carboxylic acid-N-methyl-N-dimethylaminoethylamide, 3-chloro-iminodibenzyl-5-carboxylic acid - N - ethyl-N-(β-morpholinoethyl)-amide, 3-chloro-iminodibenzyl-5-carboxylic acid-N-diethylaminoethyl amide, M.P. 97–98°, M.P. of hydrochloride 127–128.5°, 3-chloro-iminostilbene-5-carboxylic acid-N-diethylaminoethyl amide, M.P. of hydrochloride 155°, 3-chloro-iminostilbene-5-carboxylic acid-N-(β-pyrrolidinoethyl)-N-n-butyl amide, 3-chloro-iminodibenzyl - 5 - carboxylic acid-N-(β-pyrrolidinoethyl)-N-n-butyl amide, 3-chloro-iminodibenzyl - 5 - carboxylic acid-N-(β-pyrrolidino-ethyl)-N-n-butyl amide, 3-bromo-iminostilbene-5-carboxylic acid-N-diethylaminoethyl amide, 3-bromo-iminodibenzyl-5-carboxylic acid-N-diethylaminoethyl-N-methyl amide

What we claim is:

1. An N-heterocyclic compound of the formula

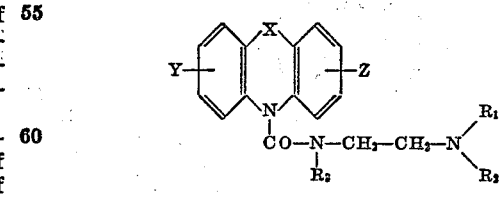

wherein X represents a member selected from the group consisting of the ethylene and vinylene group, each of Y and Z represents a member selected from the group consisting of hydrogen, chlorine and bromine, and each of $R_1$ and $R_2$ taken separately represents a lower alkyl radical and $R_1$ and $R_2$ jointly with the N-atom to which they are bound represent a member selected from the group consisting of the pyrrolidino, piperidino and morpholino radical, and $R_3$ represents a member selected from the group consisting of hydrogen and a lower alkyl radical.

2. 5-(N-n-butyl - N - dimethylaminoethyl - carbamyl)-iminostilbene.
3. 5 - (N - methyl - N-dimethylaminoethyl-carbamyl)-iminodibenzyl.
4. 5-(N-diethylaminoethyl-carbamyl)-iminodibenzyl.
5. 5-[N-n-butyl - N - (β-pyrrolidinoethyl)-carbamyl]-iminodibenzyl.

References Cited in the file of this patent
UNITED STATES PATENTS

| | | |
|---|---|---|
| 2,666,051 | Hafliger et al. | Jan. 12, 1954 |
| 2,762,796 | Morel et al. | Sept. 11, 1956 |
| 2,809,200 | Schindler et al. | Oct. 8, 1957 |